United States Patent [19]

Gross

[11] Patent Number: 4,982,412

[45] Date of Patent: Jan. 1, 1991

[54] APPARATUS AND METHOD FOR COUNTING A PLURALITY OF SIMILAR ARTICLES

[75] Inventor: Barry M. Gross, Exton, Pa.

[73] Assignee: Moore Push-Pin Company, Wyndmoor, Pa.

[21] Appl. No.: 322,715

[22] Filed: Mar. 13, 1989

[51] Int. Cl.[5] ........................ G06M 11/04; G06F 11/00

[52] U.S. Cl. ........................................ 377/6; 377/28; 377/29; 53/500; 221/2; 250/222.1

[58] Field of Search ...................... 377/6, 8, 10, 11, 28, 377/29; 221/2; 53/500; 250/222.1

[56] References Cited

U.S. PATENT DOCUMENTS

| | | | |
|---|---|---|---|
| 2,965,294 | 12/1960 | Urry | 377/10 |
| 3,618,819 | 11/1971 | Blackburn | 221/2 |
| 3,633,732 | 1/1972 | Russell | 53/500 |
| 3,677,437 | 7/1972 | Haigler | 221/7 |
| 3,730,386 | 5/1973 | Monsees | 221/7 |
| 3,746,211 | 7/1973 | Burgess | 221/7 |
| 3,823,844 | 7/1974 | Linkemer | 221/13 |
| 3,837,139 | 9/1974 | Roseberg | 53/501 |
| 3,900,718 | 8/1975 | Seward | 377/6 |
| 4,018,358 | 4/1977 | Johnson | 221/7 |
| 4,096,424 | 6/1978 | Hysler | 318/480 |
| 4,110,604 | 8/1978 | Haynes et al. | 377/10 |
| 4,139,766 | 2/1979 | Conway | 377/6 |
| 4,163,507 | 8/1979 | Bell | 221/2 |
| 4,180,153 | 12/1979 | Krishnan | 198/418.7 |
| 4,281,765 | 8/1981 | Brazell et al. | 377/6 |
| 4,298,118 | 11/1981 | Cottrell | 198/382 |
| 4,307,390 | 12/1981 | Steffen | 340/684 |
| 4,373,201 | 2/1983 | Bohan et al. | 377/29 |
| 4,519,090 | 5/1985 | Stackhouse et al. | 377/29 |
| 4,555,624 | 11/1985 | Steffen | 250/223 R |
| 4,635,215 | 1/1987 | Friend | 250/222.1 |
| 4,680,464 | 7/1987 | Bross | 250/223 R |

*Primary Examiner*—John S. Heyman

*Attorney, Agent, or Firm*—William H. Eilberg

[57] ABSTRACT

A counting device determines the number of similar articles, or parts, passing a detector. The device is especially useful in packaging small parts into containers, and in insuring that each package contains the correct number of parts. The counter is preferably of the type in which the parts interrupt a beam of light, changing the current through a photoelectric cell. When the current in the photoelectric cell falls below a predetermined threshold level, the device generates a pulse which indicates the presence of a part. The pulses are counted electronically. The device preferably includes a microprocessor which can efficiently control the counting, calibration, and diagnostic operations. The microprocessor stores information relating to the threshold current level, for a given type of part. The value of the threshold can be determined by a separate calibration procedure. The microprocessor is programmed to ignore pulses received for a predetermined time interval following the leading edge of a pulse, so as not to count the same part twice. The invention also includes circuitry for detecting faults in the system, such as an open-circuited or short-circuited photoelectric cell. The device also contains circuits for determining whether the wrong types of parts have been mixed into the batch being counted, and for determining whether more than one part has passed the photoelectric cell. The latter tests are based on a comparison of the observed level of current flowing through the detector with an expected level.

35 Claims, 4 Drawing Sheets

APPARATUS AND METHOD FOR COUNTING A PLURALITY OF SIMILAR ARTICLES

BACKGROUND OF THE INVENTION

This invention the counting of a plurality of small parts. The invention is especially useful in packing measured quantities of similar parts for distribution and sale.

It has been known, in the prior art, to count articles, or "parts", automatically prior to packaging them. U.S. Pat. No. 3,618,819 discloses a typical counting device of the prior art. The disclosure of the latter patent is incorporated by reference herein. The device shown in the patent accepts parts from a feeder, and accumulates batches of parts until the correct number has been detected. The device is then programmed to dump the batch of parts into a bag, or other suitable container, for eventual sale.

The device shown in the cited patent employs a solar cell which generates a current when light shines upon it. The parts are made to pass between the solar cell and a source of light. When the part blocks all or some of the light entering the solar cell, the current through the cell decreases. The apparatus detects the change in this current, and produces a pulse which can be counted as a part. When the desired number of parts have been accumulated, the device operates a deflector to prevent further parts from entering, and also operates a trap door to allow the counted batch of parts to fall into a container.

Various factors prevent the accurate counting of parts, in the counters of the prior art. Depending on the length and shape of the parts, a counter may interpret a single part as two parts, or it may interpret a group of several parts as one part. To the extent that the device detects more parts than are actually present, the number of parts in a package will be too small. The counters of the prior art have been programmed to compensate for these errors. But a consequence of such compensation is that many containers will contain more parts than necessary. Thus, compensation for inaccurate counting can be very costly, because customers receive more product than necessary.

The present invention provides an electronic counting circuit which solves the above-described problem, and which has various other features and advantages. With the present invention, it is possible to adjust the counter to take into consideration the length and/or shape of the parts being counted, so as to reduce the likelihood of inaccurate counting. The invention also provides for the automatic setting of values used by the system, through analysis of the actual parts to be counted. The invention also includes means for determining whether the wrong kind of part has been mixed with the parts being counted, as well as circuitry for performing diagnostic checks substantially simultaneously with the counting operation.

SUMMARY OF THE INVENTION

In the present invention, an electronic counting circuit generates electrical pulses when a part interrupts a light beam. A microprocessor, or its equivalent, analyzes the pulses and also supplies control voltages to the counting circuit. The microprocessor is programmed to ignore pulses that are too short, such as those that would be created by particles of dirt, and also to ignore any pulses that begin within a predetermined time of the beginning of a previous pulse. The latter time interval, or "dead time", can be set by the user, or the microprocessor can be programmed to determine that interval automatically. In either case, the "dead time" interval is related to the length of the parts being counted. Thus, when a pulse is detected, the counter is, in effect, temporarily disabled for the "dead time". This system is particularly useful in counting parts which have bodies containing bulges or protrusions, because it tends to prevent a single part from being counted twice.

The microprocessor is also used to control directly the operation of the electronic counting circuit. Stored in the microprocessor are values corresponding to the "full-light" current, i.e. the total current that flows through the solar cell when no part is blocking the light entering the cell, and the change in current when the full-light current is reduced to the "threshold" level, i.e. the level of current deemed sufficient to record a count. The microprocessor supplies a voltage to the counting circuit, this voltage being sufficient to cause a current equal to the threshold current to flow through the solar cell. An operational amplifier also supplies current through the solar cell. One of the inputs of the operational amplifier is also connected to the solar cell. As the light received by the solar cell changes, the output of the operational amplifier changes so that the two inputs to the amplifier will remain equal. This change in output of the operational amplifier can be recorded as a count. The signal supplied by the microprocessor assures that the counting circuit will record a count only when the current in the solar cell falls below the programmed threshold level. The sensitivity of the counting circuit is therefore digitally controlled, and is not dependent on any manual adjustment of the threshold level, or on any adjustment of an electrical component.

The counting circuit of the present invention also includes automatic calibration circuitry. The circuit determines voltages which are related to the full-light solar cell current, and to the current in the solar cell when the light is blocked by a part. The latter value is measured by passing a part by the solar cell and observing the drop in output of the operational amplifier connected to the cell. The observed values, subject to a scale factor, are stored in the microprocessor and used to set a programmed threshold in subsequent runs. This is why the threshold need not be manually adjusted.

The present invention also includes circuitry which automatically tests for system malfunctions. If the solar cell becomes short-circuited or open-circuited, the present invention detects these conditions by observing unusual voltage levels, and stops the counting apparatus if necessary. The diagnostic checks are performed virtually simultaneously with the counting, on a "time-shared" basis. A microprocessor divides a given unit of time into small subintervals, and the diagnostic checks are run during these subintervals.

The invention also includes circuitry for analyzing the amount of current drop in the solar cell. If the current drop is enough to generate a count, but not as large as expected for the type of part being counted, the system can infer that the wrong part has been erroneously mixed into the batch being counted. Also, if the current drop is appreciably larger than what would be expected for the type of part being counted, the system assumes that two parts are blocking the light to the solar cell, and adjusts the count accordingly. These checks on the level of current in the solar cell are also performed substantially simultaneously with the counting operation.

The invention is also provided with automatic means to test for accumulations of dirt on the lens or cover of the light source used with the solar cell. The system stores the value of a voltage related to the current output of the solar cell, and compares the present value with those obtained on the previous day, and at the initialization of the apparatus. By analyzing the change in this voltage over time, the system can deduce whether the output of the solar cell is too low.

It is therefore an object of the present invention to provide an electronic counting apparatus.

It is another object to provide a counting apparatus which is especially useful in counting large numbers of substantially identical parts.

It is another object to improve the accuracy and convenience of electronic counting devices.

It is another object to provide an electronic counting device in which one can electronically vary the "dead time" of the device, in accordance with the expected length of the parts being counted.

It is another object to provide a counting device as described above, in which the "dead time" setting can be determined semi-automatically.

It is another object to provide an electronic counting device in which a threshold setting is determined by a voltage controlled by a microprocessor, and wherein the threshold setting is set automatically and need not be manually adjusted.

It is another object to provide an electronic counting device having automatic means to determine faults in the system, such as short-circuits and open-circuits in a photovoltaic cell, and wherein the faults are detected virtually simultaneously with the counting operation.

It is another object to provide an electronic counting device which automatically determines, when electric power is turned on, whether the light source for the solar cell needs replacing or whether its lens or cover needs cleaning.

It is another object to provide an electronic counting device capable of determining whether the wrong kind of part has been mixed into a batch of parts being counted.

It is another object to provide an electronic counting device which detects the amount of light blockage of a photovoltaic cell, and records the passage of two parts when the instantaneous light blockage exceeds a predetermined level.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1A:
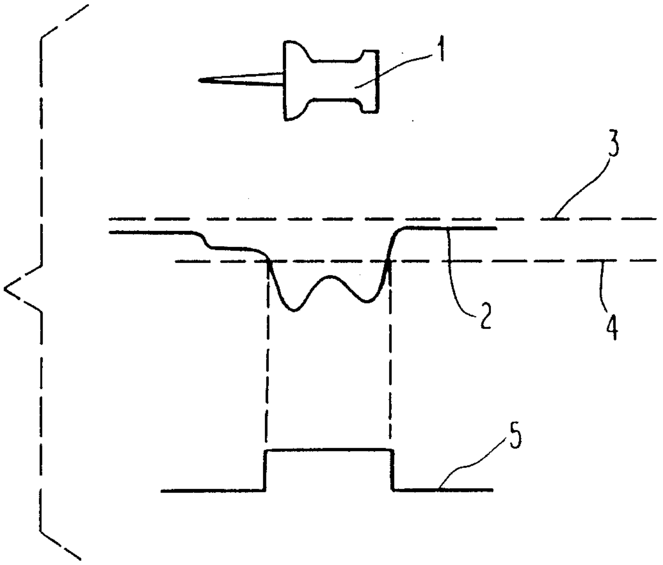
FIGS. 1A and 1B are diagrams showing the formation of pulses when an article to be counted blocks the light input to a solar cell.
Figure 1B:
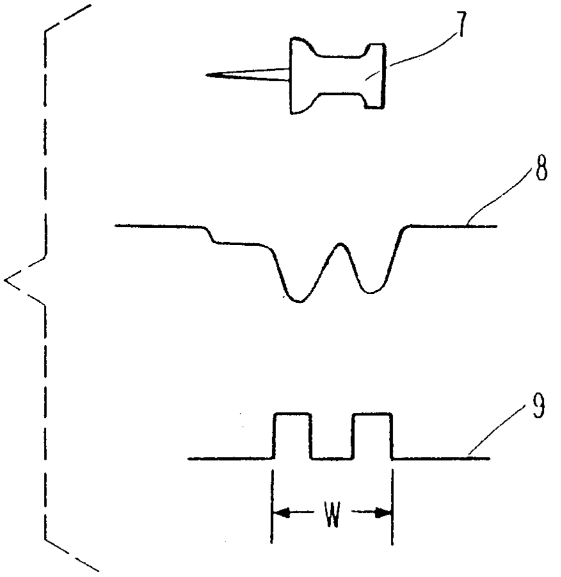

FIGS. 1A and 1B illustrate the basic features of the counting performed by this invention. In FIG. 1A, the part being counted is shown as push-pin 1, although the invention can also be used with many other types of parts. The part is passed between a light source and a photovoltaic cell, or "solar cell", such as is used in U.S. Pat. No. 3,618,819. The current flowing through the solar cell varies according to the amount of light entering the cell, and is therefore affected by the presence or absence of a part. The light source can be one or more light-emitting diodes, or any other equivalent source of light.

While the above-described apparatus is, in theory, quite simple, there are many problems which impair the accuracy of the counting. The light shining on the solar cell may be blocked by something other than a part. For example, a piece of dirt might reduce the light input, and might be erroneously counted as a part. Also, the shape of the part may induce inaccuracies. In the case of a push-pin, which has two portions of larger diameter connected by a narrower body, it is possible that the large-diameter portions could be counted as two parts. Moreover, a group of parts falling in a bunch, past the solar cell, may be counted as one part instead of two or more.

In FIG. 1A, curve 2 represents the level of current corresponding to the amount of light entering the solar cell at a given time. When the solar cell is operated in the correct current and voltage domain, the current flowing through the cell is substantially proportional to the intensity of light shining upon it. Dotted line 3 represents the level of current in the solar cell corresponding to the "full-light" condition, i.e. the condition wherein there is no part, and wherein substantially the maximum amount of light is allowed to enter the cell. Dotted line 4 represents the "threshold" current level, i.e. the level to which the current must fall before the system will count a part. The threshold level can be chosen by the user or set automatically. The threshold level must not be too low; otherwise, the device will not record many counts. The threshold should also not be too high; otherwise, the device will respond to spurious signals that are not due to the presence of a part.

In the example of FIG. 1A, the point of the push-pin does not block enough light to cause the current to reach the threshold. The current crosses the threshold level only when the lower flange of the push-pin body reaches the solar cell. In the example of FIG. 1A, the narrower body of the push-pin blocks somewhat less light than the lower flange, but the amount of light blocked is still enough to keep the current below the threshold level.

Curve 5 represents the pulse generated by push-pin 1. The pulse is generated by a comparator whose output is "high" when the solar cell current is below the threshold current, and "low" at all other times. The output of the comparator can be connected to a microprocessor, or to some other counting device. The counter is incremented for each pulse received.

Sometimes, the same part can generate more than one pulse, causing an erroneous count. In FIG. IB, suppose that push-pin 7 is made of a translucent plastic. Curve 8, like curve 2, shows the current through the solar cell. Note that the relatively thin body, because it is translucent, blocks very little light, and that the current returns almost to the full-light level. The result, shown by curve 9, is two narrow pulses. However, the true width of the part is indicated by dimension W, which includes both pulses. The single part would thus be erroneously counted as two parts.

One feature of present invention prevents inaccuracies resulting from the situation represented in FIG. 1B. The counting circuit is programmed to provide a "dead time" following the start of each pulse. That is, when a pulse is first detected, the microprocessor (or equivalent counting device) disregards all pulses that may be detected for a predetermined time interval. This "dead time" therefore begins at the leading edge of a given pulse. The amount of "dead time" is adjustable, so that the counting apparatus can be programmed, in advance, to "know" the expected length of each part being counted. If the "dead time" corresponds accurately to the length of the part, the two pulses of FIG. 1B will be counted as only one pulse.

Figure 2:
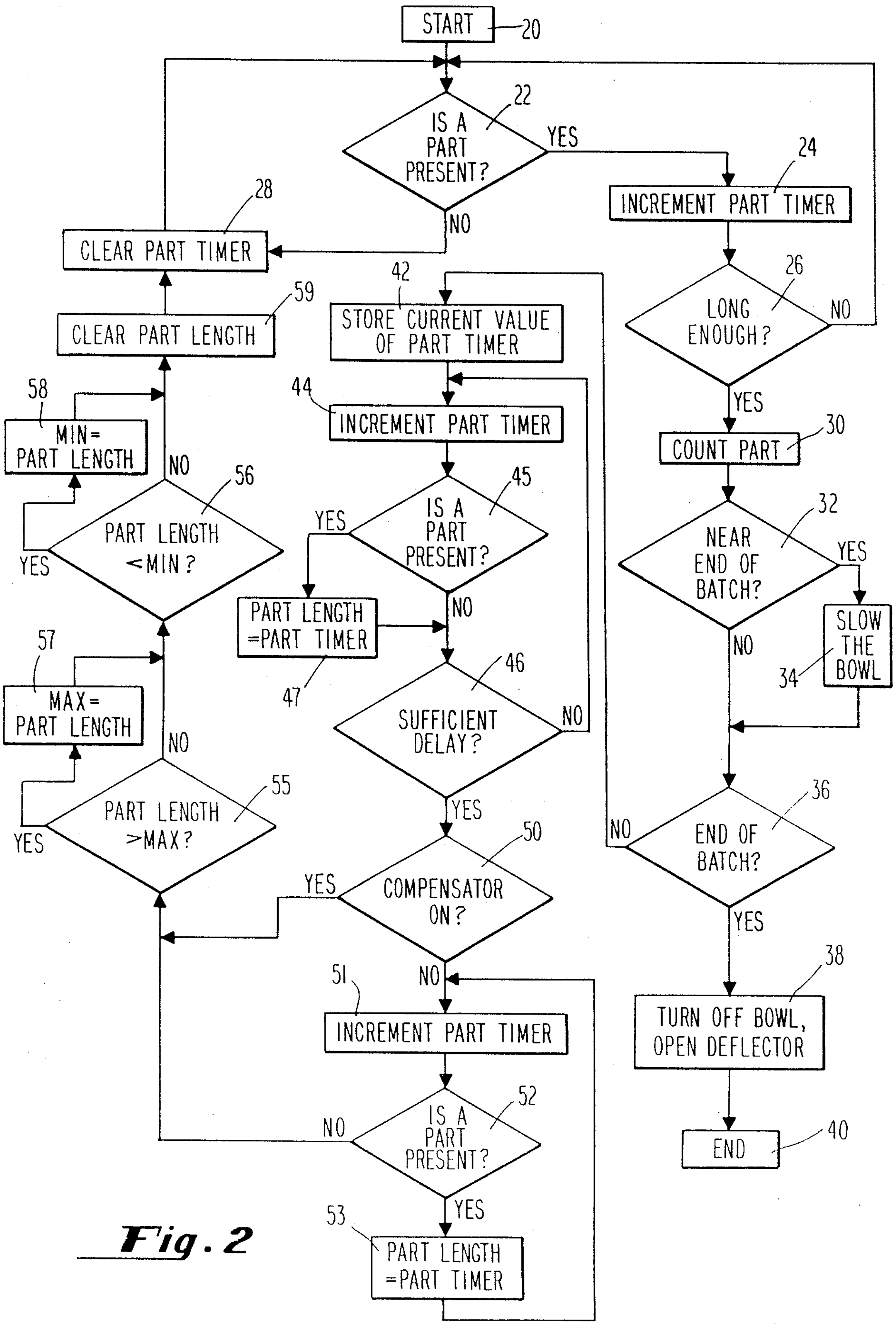
FIG. 2 is a flow chart illustrating the operation of the counting device and method of the present invention.

The flow chart of FIG. 2 illustrates the counting operation of the present invention. The steps depicted in the flow chart are preferably performed by a microprocessor, or its equivalent. FIG. 2 can therefore represent the programming of the microprocessor. In the following discussion, it is assumed that the parts are delivered by a suitable feeder, which can be a vibratory feeder. The feeder is typically in the form of a bowl, but other arrangements can be used. Devices for feeding the parts are well-known in the art, and are not part of this invention.

The flow chart of FIG. 2 depicts the steps performed in counting each batch of parts. FIG. 2 includes the program steps required to calibrate the apparatus, that is, to determine the appropriate "dead time", and to perform the actual counting. Thus, the program shown in FIG. 2 is run in two modes. The first mode is a calibration mode, wherein the system automatically sets the "dead time". The second mode is the actual counting mode. From the perspective of the microprocessor, both modes are nearly identical. The major difference between the calibration mode and the normal counting mode is that in the former, the operator must feed a series of parts past the solar cell, taking care that only one part falls past the cell at one time.

The program represented in FIG. 2 will be described first, and then the differences between the counting mode and calibration mode will be explained.

The program begins in block 20. For each run, whether for calibration or for actual counting, the system sets several variables equal to zero. One such variable is called the "part timer". The part timer represents the length of time that has elapsed since a part was first detected. The system also sets equal to zero a variable representing the part count, and a variable representing the maximum part length for a given run. Also, the system may store a variable representing the minimum part length, and this variable is initially set equal to or greater than the length of the longest possible part. The significance of these variables will be explained below.

Each cycle of the program begins with test 22. Test 22 is performed by determining whether or not a pulse is present, i.e. whether the output of the above-mentioned comparator is high or low. If a part is detected, the system increments the part timer variable, in block 24. Then, in test 26, the system checks whether the part timer has reached a predetermined value. If not, the program returns to test 22 and again determines whether a part is present. The predetermined value used in test 26 is intended to allow the system to distinguish between actual parts and "junk", such as dirt particles, electrical interference, or the like. If the pulse is too narrow, the system assumes that the pulse was not caused by a part, but by "junk". Thus, the predetermined value stored in the microprocessor and used in test 26 represents the minimum pulse width required to generate a count. In other words, a part is not counted if the pulse width is narrower than the predetermined minimum.

If the program returns to test 22 and then determines that a part is not present, the program branches to block 28, where the part timer variable is cleared, and the counting process begins again.

If a part is detected, and the pulse is sufficiently wide, i.e. tests 22 and 26 indicate the presence of a part for a time sufficient for the part timer variable to reach its predetermined minimum, the system assumes that a true part is present, and records a count, in block 30. Recording a count can be done by incrementing the part count variable in the memory of the microprocessor.

In test 32, the system determines whether the batch of parts is almost complete. This test is done by comparing the current value of the part count variable with the predetermined number of parts required for a full batch. If the number of parts counted is within, say, three parts of the desired number, the system, in block 34, slows the vibratory feeder, or equivalent device, which delivers the parts to the counter. The number three is chosen arbitrarily and is programmed into the system; other numbers can be used.

Next, the system checks, in test 36, whether the end of the batch has been reached, i.e. whether the part count variable has reached its preselected final value. If so, the system turns off the bowl, and opens a deflector gate, in block 38. The deflector gate is positioned to allow the counted batch of parts to fall into a suitable container, and to prevent further parts from falling into the container. There may be more than one deflector, or other mechanical means, operated by the system. The system then stops, in block 40. A complete batch has now been counted.

If the result of test 36 indicates that the end of the batch has not been reached, the system continues in block 42. The purpose of the portion of the program represented by blocks 42 and 44, and test 46, is to provide the "dead time" mentioned above. That is, after a part is detected, the system will not record another count until a predetermined time has elapsed.

To provide the required "dead time", the system stores, in block 42, the current value of the part timer for later use. Then the part timer is incremented in block 44. In test 45, the system checks for the presence of a part, the test being similar to test 22. That is, test 45 is performed by determining whether the output of the comparator is high. If a part is present, the program sets a "part length" variable equal to the current value of the part timer. Note that the part length variable is not incremented, but is set equal to the most recent value of the part timer. In test 46, the system compares the current value of the part timer with the value that was stored in block 42. The difference between the current value and the stored value represents the delay that has elapsed since the part was counted. Test 46 compares this delay with a stored "dead time" constant, which represents a predetermined desired "dead time". Unless the delay exceeds the "dead time", the program returns to block 44, and the intervening steps are repeated. The loop consisting of test 45 and block 47 is used in the semi-automatic determination of the necessary "dead time", as will be explained later.

Test 50 determines whether the "compensator" is on. The purpose of the compensator is to record additional counts when a group of parts is traveling past the solar cell. If the compensator is on, then the program bypasses blocks 51 and 53, and test 52, and ultimately returns to test 22. With the compensator on, the result is that, as long as the system continues to detect a pulse of the required minimum width, the system will count another part. With the compensator off, the system loops until a part is not present, preventing the system from recording another count until the group of parts has passed.

If the compensator is off, the system increments the part timer, in block 51. Then the system checks for the presence of a part, in test 52. Test 52 is similar to tests 45 and 22, and is based on the output of the comparator described above. If a part is present, the system proceeds to block 53, where the part length variable is set equal to the current value of the part timer variable. Control then returns to block 51, and the program will loop continually until a part is no longer present. If a part is not present, the system continues in test 55.

The program steps represented by blocks 47, 51, and 53, and by test 45, are exclusively associated with the automatic determination of "dead time". The "dead time" is based on the maximum part length. In test 45 and block 47, the part length variable is reset to the current value of the part timer, as long as a part is detected. Then, in the loop consisting of blocks 51 and 53 and test 52, the part length is similarly reset. The purpose of the latter loop is to test for parts which are longer than the previously set "dead time". That is, if a part is sufficiently long that the program breaks out of the loop between block 44 and test 46, another test is needed to obtain the correct value of the part length.

Note that if the system did not include a means for determining "dead time", blocks 51 and 53 could be omitted, and test 52 could be configured to loop continually until a part is not present. That is, if a part were present, test 52 would be executed again, until it determines that a part was not present. In the embodiment shown in FIG. 2, the "dead time" calibration feature is available only when the compensator is off. But it is also possible to program the microprocessor so that the status of the compensator is not linked to that of the "dead time" calibration feature.

The system can be provided with means (not shown) for determining an "overflow" condition, which would occur if the comparator output remains high even after a part is no longer present. In such condition, the system could be programmed to halt, and to alert the operator about the malfunction.

When test 52 indicates that a part is not present, or if the compensator is on, the system continues in test 55. In test 55, the value of the part length variable is compared to a stored maximum value. The derivation of this maximum value will be explained later. If the part length is greater than the maximum, the system sets the maximum equal to the part length, in block 57.

In test 56, the system determines whether the part length variable is less than the previously stored minimum part length variable. If so, the minimum part length is set equal to the current part length, in block 58. The system then clears the part length variable, in block 59, and the part timer, in block 28, and returns to test 22.

Test 56 and block 58 are used for automatically setting the "junk" time used in test 26. The setting of the "junk" time value is done during calibration, as will be explained below.

The operation of the program of FIG. 2, as used in the calibration mode, will now be described. As mentioned earlier, the value of the "dead time" can be set manually by the user, or it can be set semi-automatically. The semi-automatic determination of "dead time" is what is done in the calibration mode.

First, it is assumed that the operator has set a switch which tells the system that it is in the calibration mode. The program therefore sets the maximum part length variable equal to zero, as part of the initializations performed in block 20. As in the normal counting mode, the part timer and part count are set to zero. Also, the compensator is turned off. Finally, unlike the normal counting mode, the "dead time" constant, used in test 46, is also set equal to a value which is at least as great, and preferably somewhat greater than the length of the longest possible part. The latter setting assures that the program will remain in the loop defined by test 46 and block 44 for the entire length of the part, even if the part has a "hole" in its center which may not register as a part. Note that this setting of the dead time constant insures that the answer to test 52 will always be "no" during the calibration mode.

The user then feeds parts, one at a time, through the system. This can be done by operating a vibratory feeder, while manually insuring that only one part falls past the solar cell at one time. Preferably, about twenty parts, or more, are allowed to fall past the solar cell. The program operates as described above, with only one difference, namely that the program sets the dead time equal to or greater than the length of the longest possible part. When the twenty or so parts have fallen past the solar cell, the value of the maximum part length variable corresponds to the actual maximum length of the parts that have fallen past the solar cell. When the above operation is complete, the system increases the maximum part length by 10%, and stores the result as the new "dead time" constant, which will be used in test 46. The figure of 10% is arbitrary, and can be varied. It is preferred to use a "dead time" constant which is somewhat greater than the maximum length of the parts.

In the normal counting mode, the operator sets a switch to deactivate the calibration mode. Now, the program is executed as before, but the constant value of "dead time", determined as described above, is now used in test 46. Note that the system still passes through the section beginning with test 55 on each iteration of the counting. Thus, since the maximum part length variable is set equal to zero before counting each batch, the current value of the maximum part length represents the length of the longest part in the last batch of parts. This value can be read by the operator on a digital display, if desired. Note that the maximum part length is a variable which is reset while counting each batch of parts, while the "dead time" is a constant, set only during initial calibration.

As mentioned above, the value of the "junk" time can also be determined when the system is determining "dead time". The "junk" time is initially set to zero, or very slightly greater than the width of expected electrical noise pulses. Then, as a result of the calibration process described above, the system determines a minimum part length for the parts fed past the solar cell.

After the last part has been fed, the system then multiplies the minimum part length by an arbitrary and constant fraction, such as 0.25, to obtain the value of "junk" time used in test 26. The value of this fraction can change, but it must be less than unity.

Note that the automatic setting of "junk" time is optional. If this feature is omitted, then test 56 and block 58, in FIG. 2, could be eliminated.

In the embodiment illustrated in FIG. 2, a single part timer is used to determine the presence of "junk" and to determine whether the required "dead time" has elapsed. The system could also be programmed with a separate "junk" timer and "delay" timer. Either variation can be used, and both are within the scope of the invention.

Figure 3:
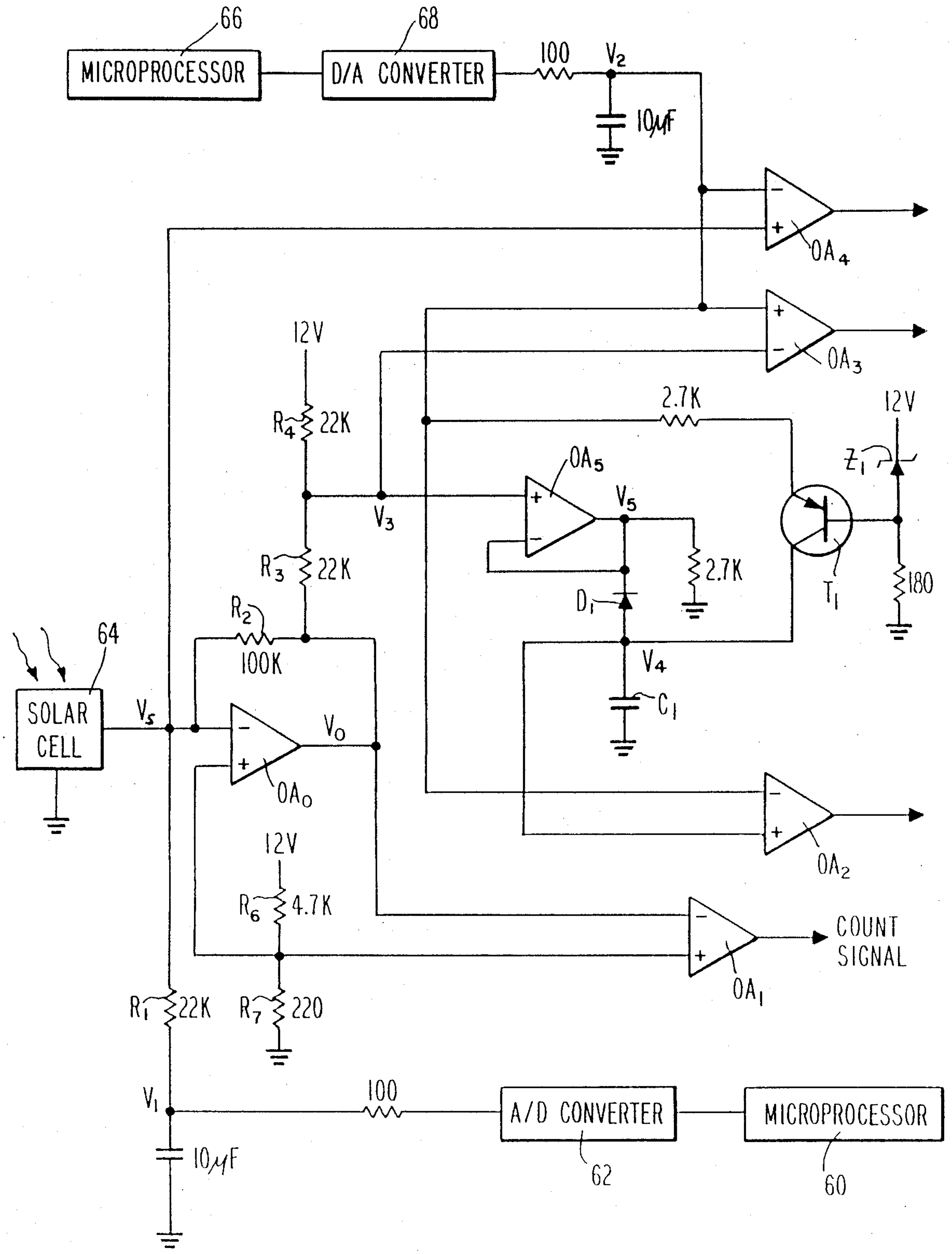
FIG. 3 is a schematic diagram of a counting circuit made according to the present invention.

FIG. 3 is a schematic diagram showing the essential features of the counter of the present invention. Operational amplifiers $0A_0$ and $0A_1$, and their associated components, comprise the counting circuit itself. The counting circuit operates in the following manner. Microprocessor 60 provides a digital signal which, when converted into an analog voltage by digital-to-analog converter 62, produces voltage $V_1$, as indicated. Voltage $V_1$ is chosen to be the voltage which, in the absence of $0A_0$, would cause a programmed threshold current to flow through photovoltaic ("solar") cell 64. More precisely, $V_1$ is set equal to a voltage which is the difference between the voltage which would cause the full-light current to flow through the solar cell, and the voltage which represents the change in current from the full-light condition to the threshold condition. The microprocessor stores both of the latter numbers in its memory, and $V_1$ is obtained by calculating their difference. The 100-ohm resistor and 10 microfarad capacitor adjacent to converter 62 are for filtering noise from the microprocessor signal. The microprocessor may be the same microprocessor which executes the program represented in FIG. 2, but the function described herein is independent of the subject matter of FIG. 2.

Note that the "programmed threshold", which is related to $V_1$, is, in general, higher than the "physical threshold". The programmed threshold is the threshold at which the circuit is programmed to record a count. The physical threshold is the level to which the solar cell current actually declines when a part blocks the light. The difference between these thresholds will be explained more fully below.

Voltage $V_1$, which, in effect, corresponds to the programmed threshold current, can be determined semiautomatically by the system, as will be described later, or it can be set manually.

The positive inputs of operational amplifiers $0A_0$ and $0A_1$ are connected to a voltage divider, comprising resistors $R_6$ and $R_7$. In the example of FIG. 3, the power supply provides 12 volts, and the voltage applied to the positive inputs of the operational amplifiers is about 0.5 volts. The voltages applied to the two operational amplifiers need not be the same, and need not be the exact values specified in this example. For reasons that will be apparent later, it is necessary that the voltage applied to the positive input of $0A_0$ be nonzero. The voltage divider can take other forms. For example, $R_7$ could be replaced with a diode, which will reduce electrical noise.

There are three cases to consider in the operation of the counting circuit. In the first case, there is nothing to block the light to the solar cell, and the full-light current flows through that cell. In the second case, there is a partial blockage of light to the solar cell, but not enough to register a count. In the third case, the light to the solar cell is blocked sufficiently to reduce the current below the programmed threshold, and to count a part.

Assume, first, that there is nothing blocking the light to the solar cell. As explained above, voltage $V_1$ is determined by an output of microprocessor 60, and is chosen such that it causes the programmed threshold current to flow through the solar cell. $0A_0$ is an operational amplifier, which, by definition, has an output proportional to the difference between its inputs. Due to the feedback loop provided by $R_2$, the change in $V_0$ is such as to make the voltages at the two inputs equal. That is, $V_0$ must change so as to make $V_s$ equal to the 0.5 volts applied to the positive input of $0A_0$. Thus, $V_0$ will increase until it makes $V_s$ equal to the 0.5 volt level, and the total current through the solar cell is equal to the full-light current. Thus, the current through $R_2$ is the change in current ("$\Delta I$") between the full-light and programmed threshold conditions. Thus, $V_0$ is the voltage which causes current $\Delta I$ to flow through $R_2$. Note that, for a given run, the full-light and programmed threshold currents are fixed, so $\Delta I$ is a constant.

Amplifier $0A_1$ functions as a comparator; its output is "high" if its positive input is greater than its negative input, and "low" in all other cases. As long as the value of $V_0$ exceeds the offset voltage of 0.5 volts, the output of $0A_1$ will remain "low", and no part is counted. The current difference $\Delta I$ must be sufficiently great that $V_0$ is far above 0.5 volts during the full-light condition. A $\Delta I$ which is too small will prevent accurate counting.

Now consider the case wherein there is a partial blockage of the solar cell, but not enough blockage to register a count. This condition could be caused by a dirt particle passing between the light source and the solar cell. Voltage $V_1$ remains the same, because it is held constant by the microprocessor. The particular characteristics of the solar cell are such that for a given level of light, the cell attempts to draw a certain amount of current from $0A_0$. In the case of partial blockage, the current through the solar cell is less than the full-light current and greater than the programmed threshold current. So $V_0$ will decrease somewhat, to hold $V_s$ at 0.5 volts, so that the current through $R_2$ is somewhat less than $\Delta I$. This decrease in $V_0$ is not enough to reduce $V_0$ to 0.5 volts. Thus, the negative input to $0A_1$ is still larger than the positive input. Therefore, no part is counted.

Now suppose that a part blocks the light to the solar cell, i.e. the current through the cell is less than the programmed threshold value. $V_1$ remains fixed, as before. $V_0$, being controlled by $0A_0$, therefore decreases further so as to keep the input voltages to $0A_0$ equal. When $V_0$ falls below 0.5 volts, the negative input to $0A_1$ is less than the positive input, and a pulse representing a count signal appears at the output of $0A_1$. $V_0$ can fall appreciably below the 0.5 level, if the current through the solar cell is sufficiently reduced. However, the maximum negative excursion of $V_0$ is limited by the power supply. In the example shown, where the power supply is of $\pm 12$ volt capacity, $V_0$ cannot fall below $-12$ volts.

It is theoretically possible to count parts directly by simply connecting the solar cell to a comparator such as $0A_1$. But the latter arrangement is not practical for several reasons. First, one would need to choose the voltage at the positive input of $0A_1$ to make the proper threshold comparison. A major advantage of the circuit of the present invention is that the necessary information about the threshold current level is stored in the microprocessor, and the voltage input to $0A_1$ need not be manually adjusted. Storing the threshold information only in the microprocessor makes it very easy to change the value when the apparatus is used for counting another type of part. Secondly, if one omitted the branch of the circuit which provides voltage $V_1$, then in order to maintain the same sensitivity with the same value of $R_2$, $V_0$ would need to be very high. If one reduced $R_2$, so as to reduce the voltage level of $V_0$, the sensitivity of the circuit would be impaired. That is, a given change in the solar cell current would cause too small a change in $V_0$.

The following is an explanation of the calibration of the apparatus, i.e. the determination of the full-light current and the current $\Delta I$, which are stored in the microprocessor. To determine the full-light current, the microprocessor uses a separate program which executes the following steps. It is assumed that the apparatus is turned on, and that an unobstructed light beam is shining on the solar cell. The microprocessor first sets $V_1$ (by setting an appropriate digital signal which is converted into $V_1$ by converter 62) equal to zero. Then, while monitoring the output of $0A_1$, the microprocessor increments $V_1$ until the output of $0A_1$ switches from "low" to "high". The point at which the output of $0A_1$ is just about to switch from low to high is the point at which the value of $V_1$ generates the total full-light current through the solar cell. Note that this value of $V_1$ is not the value used during the normal counting operation. When counting, $V_1$ is related to the difference between the full-light current and $\Delta I$, i.e. the normal value of $V_1$ is the voltage which causes the programmed threshold current to flow through the solar cell.

Other algorithms for finding $V_1$ could be used. For example, the microprocessor could initially increment $V_1$ in large steps, then reduce $V_1$ when the output of $0A_1$ changed, and then repeat the process using smaller increments, until the process converges on the correct value. Such alternatives are within the scope of the invention.

The determination of the correct value for the voltage related to $\Delta I$ is somewhat more complex. It is possible to determine this voltage by trial and error, i.e. by trying different values and observing which one yields correct results in counting. But a preferred way of determining the voltage related to $\Delta I$ employs the additional circuitry shown in FIG. 3, and described below.

The circuit for determining the setting of $V_1$ includes the operational amplifiers $0A_2$ and $0A_5$, transistor $T_1$, diode $D_1$, and their associated components. This circuit is used only for determining $V_1$, and during normal counting, this circuit is ignored, and has no effect on the counting operation. The microprocessor, using a different program from those described above, assumes that $\Delta I$ is very small, so that virtually any part passing the solar cell will generate a count, but so that a count is not recorded when there is no part. Thus, during this calibration procedure, $V_1$ is set to produce a current, through the solar cell, which is slightly less than the full-light current.

Next, one allows a part to pass the solar cell. As explained above, when a part blocks the light to the solar cell, $V_0$ decreases. Thus, voltage $V_3$ will also decrease. Voltage $V_5$, which is the output of amplifier $0A_5$, follows $V_3$. The purpose of $0A_5$ is to isolate voltage $V_3$, which is related to the output of the counting circuit, from the calibration circuit. Voltage $V_4$ is related to voltage $V_5$, as dropped through the resistance of $D_1$. $V_4$ also decreases, and reaches a minimum level when the part is blocking all the light it can block. Now when the part passes the solar cell, and the output of the cell returns to the fulllight current, $V_0$ increases to its former value, and $V_3$ and $V_5$ similarly increase. However, capacitor $C_1$ cannot recharge because of the direction of diode $D_1$. That is, $C_1$ will discharge when $V_5$ decreases, but does not become recharged when $V_5$ increases. Thus, if the drop across $D_1$ is very small, $V_4$ is essentially equal to the lowest value assumed by $V_5$ while a single part is passing the solar cell.

Amplifier $0A_2$ allows the system to determine the value of $V_4$ by comparing $V_4$ with a predetermined reference voltage $V_2$. $V_2$ is generated by microprocessor 66 and digital-to-analog converter 68. Microprocessor 66 can be the same as microprocessor 60, although its function of generating voltage $V_2$ is separate from all of the other microprocessor functions described above. Microprocessor 66 increases $V_2$ until the output of $0A_2$ switches from one condition to the other, and then stores the value of $V_2$ which represents the value of $V_4$. Microprocessor 66 must then provide microprocessor 60 with the calculated value of $V_2$. The circuit represented by $0A_5$, $D_1$, and $C_1$ can be characterized as an automatic "sample and hold" circuit.

The value of $\Delta I$ is directly related to the difference between $V_4$ at the full-light condition, and the value of $V_4$ when a part is blocking the light to the solar cell. Preferably, one measures $V_4$ for several parts, and subtracts the largest of these values from the value of $V_4$ at full-light. Thus, one selects the value of $V_4$ which minimizes $\Delta I$, which makes the counter more sensitive, because a count will be registered due to a smaller drop in $V_0$. The value of $V_4$ at the full-light condition can be calculated directly in advance, from the characteristics of the solar cell, and from knowledge of the voltage drops across the diode and resistors. Alternatively, $V_4$ at the full-light condition can be measured by $0A_2$, by adjusting the value of $V_2$ until it equals that of $V_4$, similar to the technique described above. If $V_4$ is measured to find its value at the full-light condition, the equation relating $V_5$ to $V_4$ must use a lower value for the voltage drop across diode $D_1$, because the amount of current flowing through the diode is smaller in the steady-state (i.e. full-light) condition than when parts are passing by the solar cell.

The determination of $V_4$ can be coordinated by microprocessors 60 and 66, based on whether a count signal is present at the output of $0A_1$. If the output of $0A_1$ is low, there is no need to attempt to determine $V_4$, since there is no part. The determination of $V_4$ is performed only when a part is detected.

The value of $V_1$ to be provided by microprocessor 60 is determined as follows. The system computes the voltage difference described above ($V_4$ at full-light minus the maximum $V_4$ when a part is present) and multiplies this difference by a scale factor to convert it into units which correspond to $V_1$. The result is then subtracted from the value of $V_1$ at the full-light condition. Then, this result is adjusted so that the programmed threshold will be higher than the physical threshold. The result is the voltage $V_1$ which is stored by microprocessor 60, and which is constant during operation of the device.

Thus, the circuit is programmed to record a count when the solar cell current falls below a predetermined level, the latter level being greater than the level to which the current actually falls when a part blocks the light to the cell. Making the programmed threshold higher than the physical threshold makes the counting device more sensitive.

As mentioned above, the preferred procedure for determining $V_1$ includes dropping a plurality of parts past the solar cell and using the largest value of $V_4$ at the blocked-light condition. Thus, after taking each measurement, one needs to re-set $V_4$ before the next part is dropped by the solar cell.

The re-setting of $V_4$ is accomplished as follows. The voltage at the base of transistor $T_1$ is regulated by Zener diode $Z_1$, and, in the specific example given in FIG. 3, the voltage at the base of $T_1$ is about 10 volts. Then $V_2$ is momentarily set, by microprocessor 66, to be slightly higher than the voltage at the base of $T_1$, i.e. about 11 volts in this example. The transistor therefore becomes forward-biased, and current flows through it. If $V_2$ is sufficiently high, $V_4$ will rapidly increase, and will become somewhat greater than $V_5$. $V_4$ and $V_5$ will differ only by the voltage drop through $D_1$. $V_4$ cannot become very much greater because operational amplifier $0A_5$ prevents $V_5$ from deviating from $V_3$. Thus, $V_4$ is restored to its former value, and the process can be repeated with another part. In this embodiment, it is assumed that, except when $V_4$ is being re-set, the value of $V_2$ is always less than 11 volts. However, the circuit for re-setting $V_4$ is not used for any other purpose, and the value of $V_2$ at all other times is not really important. Note also that the voltages given here are only examples; other voltages could be used, provided that currents are made to flow at the desired times.

Note that the value of $V_2$ used to re-set voltage $V_4$ is not, in general, the same as the value used in the determination of $V_1$. On the contrary, microprocessor 66 is programmed to provide a value of $V_2$ which is appropriate for the function being performed. As will be apparent from the discussion below, $V_2$ is used for a variety of tasks, and microprocessor 66 must therefore set and re-set $V_2$ many times. It is also possible to provide a separate microprocessor for each use of $V_2$, and this alternative is within the scope of the present invention.

The circuit of FIG. 3 also includes means for testing for malfunctions in the counting device. One such malfunction occurs when the solar cell becomes open-circuited. The test for an open-circuit condition, as well as the other tests to be described, is continuously run while the counter is operating, using a multiplexing scheme. That is, during each interval of time, the counting circuit is operating for a segment of that interval and the diagnostic circuits are enabled for other segments.

Suppose the solar cell becomes open-circuited. Then the current that would otherwise flow through the cell cannot do so, and Vs rises, causing $V_0$ to decrease so as to try to hold $V_s$ at 0.5 volts. Vs tends to rise until the current through $R_1$ equals the current through $R_2$, since the current flowing into a junction must equal the current flowing out of the junction. This condition can be described by Ohm's law as $(V_1-V_s)/22=(V_s-V_0)/100$. Thus, one can calculate Vs as a function of $V_0$. Now suppose that $V_0$ has reached its maximum negative excursion, i.e. $V_0$ has fallen to $-12$ volts. Microprocessor 66 calculates $V_s$ for $V_0=-12$ volts, and sets $V_2$ to be slightly below this calculated value of $V_s$. $V_s$ is connected to one input of amplifier $0A_4$, the other input being connected to $V_2$. $0A_4$ is configured as a comparator. Then if $V_s$ increases beyond this value, the output of $0A_4$ becomes high, and the system therefore knows that the solar cell must be open-circuited. The output of $0A_4$ is then used to generate a signal which stops the counting and turns off the parts feeder.

Suppose now that solar cell 64 is open-circuited, but $0A_0$ is able to sink all the current caused by the rise in $V_s$, without driving $V_0$ below its maximum negative value. In this case, $V_s$ will remain at 0.5 volts. Using the equation given above, one calculates the value of $V_0$ which makes $V_s$ equal to 0.5 volts. One then calculates the value of $V_3$ which would result from the latter value of $V_0$. Microprocessor 66 then sets $V_2$ to be slightly above the latter value of $V_3$, and compares $V_2$ with the actual value of $V_3$, using $0A_3$. If the output of $0A_3$ becomes high, the counting circuit is stopped.

It should be noted that the purpose of creating voltage $V_3$ is only to re-scale voltage $V_0$ for comparison with $V_2$. The re-scaling is often necessary if the voltage available at digital-to-analog converter 68 is limited in range. If $V_2$ is unlimited in range, then $V_3$ would not be needed, and the comparison could be made directly between $V_0$ and $V_2$ Thus, the open-circuit test is conducted in two parts, one for the case where $V_0$ falls to its maximum negative value, and the other where $V_0$ is above the maximum negative value. The first case is performed by $0A_4$; the second, by $0A_3$. The values of $V_2$, for the two parts of the test, are different, in general, and are set by microprocessor 66 at the appropriate segments of the operating cycle. Of course, the two tests could be performed simultaneously if separate microprocessors were used.

Another test determines the presence of a short circuit. The solar cell itself could be short-circuited, or there could be a short circuit in the line, say, from $V_s$ to ground. If there is a short circuit, all of the current due to $V_1$ will flow to ground, and $V_0$ will rise, as $0A_0$ tries to hold $V_s$ at 0.5 volts. Since a short circuit effectively forces $V_s$ to be zero, $0A_0$ can never achieve equilibrium, and $V_0$ will rise to the maximum value permitted by the power supply. $V_3$ correspondingly rises. Microprocessor 66 sets $V_2$ equal to a value which is slightly less than this maximum value of $V_3$, and $V_2$ and the actual value of $V_3$ are compared in $0A_3$. If $V_3$ is too high, the system knows that the solar cell is short-circuited, and the output of $0A_3$ becomes low, causing the system to halt. It is because of the short-circuit test that the positive input to $0A_0$ must be held at a nonzero voltage. The exact value of this voltage is not critical, provided that it is not zero. If the positive input were grounded, then $V_s$ would normally be at zero volts, and the system would not be able to distinguish the short-circuit case from the case of normal operation. If one were to omit the short-circuit test, then one could make this voltage zero, i.e. one could ground the positive inputs of $0A_0$ and $0A_1$, and the latter arrangement would be more convenient.

Note that, for one test, the system halts when the output of $0A_3$ becomes high, and for another test, the system halts if $0A_3$ becomes low. The system must take into consideration the time interval during which the output of $0A_3$ is being measured. The interpretation of that output depends critically on when it is measured.

Another diagnostic test, included in the circuit of the present invention, determines whether the wrong kind of part has been mixed into the batch of parts being counted. The test uses $0A_3$, but, of course, the test is performed during a different segment of time from those of the tests discussed above. As explained above, the threshold current level implicitly programmed into voltage $V_1$ is higher than the level to which the solar cell current will actually fall when a part blocks the light. This fact is the basis of the present diagnostic test. The idea is to determine whether a part which blocks sufficient light to record a count (i.e. enough to reduce the solar cell current to the programmed threshold) has not blocked enough light to reach the physical threshold. If so, the system can conclude that the part is too small, and that it is the wrong kind of part.

The above test is performed by observing $V_0$. As explained above, when a part blocks the light to the solar cell, $V_0$ decreases. A decrease in $V_0$ causes a decrease in $V_3$. When a part blocks the maximum amount of light, $V_3$ falls to a minimum, and this minimum can be calculated from the measured minimum $V_4$, obtained as explained above. Microprocessor 66 stores a value which is slightly greater than this minimum value of $V_3$, which is essentially related to the physical threshold. The microprocessor sets $V_2$ equal to the latter stored value. $0A_3$ compares the actual value of $V_3$ with $V_2$. If $V_3$ falls sufficiently to generate a count, but not far enough to equal $V_2$, i.e. if the blockage of light is enough to cross the programmed threshold but not the physical threshold, then the system knows that the count was generated by the wrong type of part. If $V_3$ does not fall sufficiently to generate a count, the system ignores the output of $0A_3$. In the latter test, the value of $V_2$ can also be called a "wrong parts" threshold. The "wrong parts" threshold need not be equal to the physical threshold; the sensitivity of the test can be varied by changing the setting of the "wrong parts" threshold.

The test for determining whether the wrong kind of part has been mixed with the parts being counted can also be performed in another manner. This alternative test uses a "wrong part" threshold which is set substantially higher than the physical and programmed thresholds, but not so high as to be crossed when a dirt particle causes the solar cell current to drop. Microprocessor 66 sets $V_2$ equal to this value, and $0A_3$ compares the actual value of $V_3$ with $V_2$ to determine if this threshold has been crossed.

A "wrong part" is detected when the blockage of light is enough to cross the "wrong part" threshold but not enough to cross the programmed threshold, i.e. not enough to be counted. In other words, parts that are larger than dirt particles, but not large enough to reduce the solar cell current below the programmed threshold, are considered "wrong parts".

Thus, a "wrong part" can be detected by setting a "wrong part" threshold either above or below the programmed threshold. The system can be programmed to detect a "wrong part" when it determines that the blockage of light is enough to cross one threshold but not both. For either of the above-described tests for "wrong parts", the greater the distance between the "wrong part" threshold and the programmed threshold, the greater the sensitivity of the "wrong parts" test.

Note that the above-described "wrong parts" tests can only determine if the part is smaller, not larger, than the desired size. However, a part which is larger than the correct size cannot fall through the feeder, due to the construction of the feeder. The prior art is filled with feeders which are capable of rejecting parts larger than a desired size.

Another feature of the present invention is its ability to determine the amount of light blocked by a part, and to count the part as two parts if a sufficient amount of light is blocked. This feature is called the "light compensator", but is not the same as the compensator discussed earlier. According to this feature, microprocessor 66 sets $V_2$ equal to the value to which $V_3$ would fall if the current through the solar cell is substantially below the physical threshold level. $0A_3$ then compares $V_2$ with the actual value of $V_3$. If $V_3$ falls below $V_2$, the system assumes that the light has been blocked by more than one part, and counts the pulse as two parts. The setting of $V_2$ can be varied to vary the sensitivity of this test.

Figure 4:
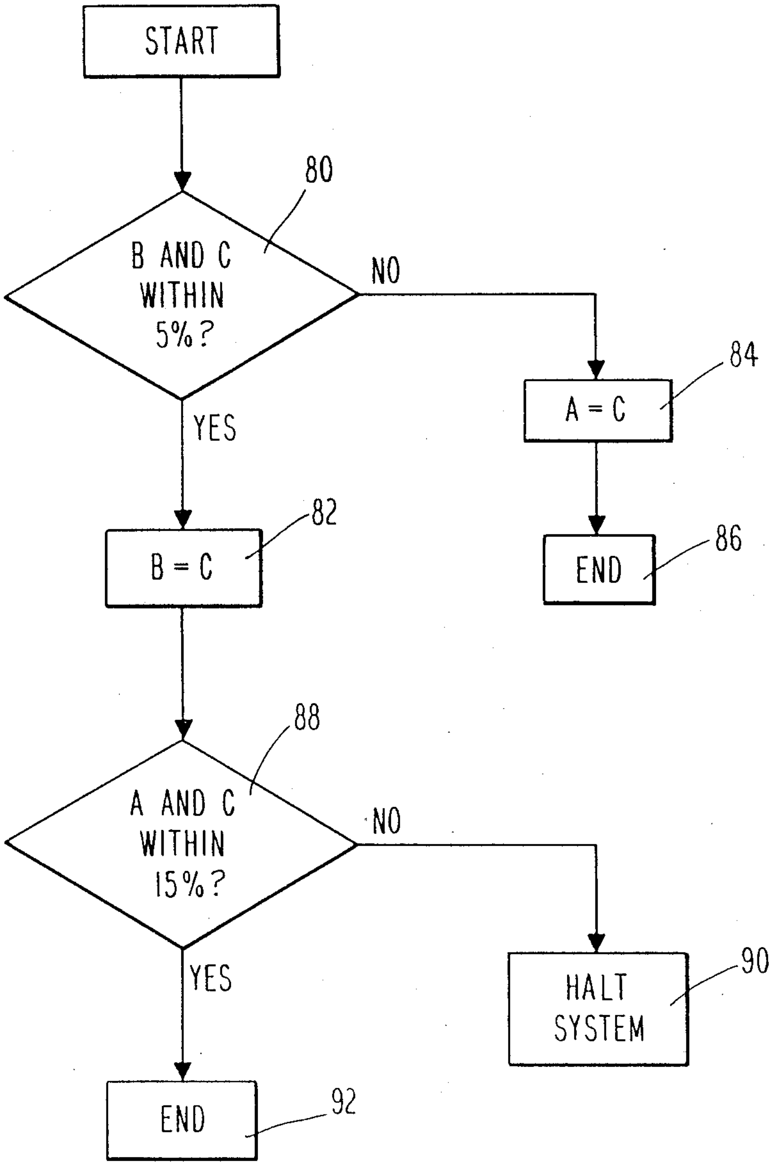
FIG. 4 is a flow chart showing a program to determine whether there is an unacceptable accumulation of dirt blocking the light entering the solar cell.

FIG. 4 is a flow chart which illustrates a diagnostic procedure for determining whether there is an accumulation of dirt on the lens or cover of the light source for the solar cell. As the lens becomes dirty, or as the cell ages, the cell current decreases. Eventually, the cell must be replaced, and/or the lens must be cleaned, in order to maintain the desired accuracy of counting.

The test for dirt on the lens is performed in the following manner. When the power is turned on, the system determines $V_1$, using the procedures discussed above, for the full-light condition. The memory of the microprocessor (such as microprocessor 60) contains three variables, called A, B, and C, representing the values of $V_1$ initially, on the previous day, and at present. The procedure is shown in FIG. 4. In test 80, the program compares B and C, and determines whether they are within a predetermined percentage (such as 5%) of each other. If not, the system sets A equal to C, in block 84. That is, the initial value is set equal to the current value, and the test is concluded in block 86. If the value of $V_1$ at full-light has changed so rapidly in one day, the reason is assumed to be that the solar cell was changed, or the lens or cover was cleaned, since a gradual dirt buildup would not cause such a rapid change in $V_1$.

If the result of test 80 is positive, the system sets B equal to C, in block 82. That is, the "previous day" value is set equal to the current value. Then, in test 88, the system checks whether C and A are within a predetermined percentage (such as 15%) of each other. If not, the system halts, in block 90, because the dirt accumulation or deterioration of the solar cell has reached an unacceptable level. That is, although the present value of $V_1$ is close to the value of the previous day, the present value has moved sufficiently far from A, the original value, to cause a problem. On the other hand, if C and A are sufficiently close, the system ends the diagnostic test, in block 92.

The above-described test is preferably performed each time the system is activated, at the beginning of the day. The procedure can be performed just after the initial calibration described earlier. The percentage tolerances given above are only exemplary, and can be varied.

There are four calibration functions which must be performed with the present system. Two of these should normally be performed daily; the other two need be performed only when changing the type of parts to be counted.

The calibrations that are performed daily include the determination of $V_1$ at the full-light condition, and the test for dirt illustrated in FIG. 4. The calibrations that are performed when the type of part is changed are the determination of "dead time" (and "junk" time, if it is to be set by the system) and the determination of the constant value of $V_I$ which is provided by microprocessor 60.

While the invention has been described with respect to specific embodiments, it is understood that many variations are possible. The particular arrangement of microprocessors can be varied, within the scope of the invention. The system can include more microprocessors to enable the various tests to be performed substantially simultaneously, and without the need for "time sharing" of one or two microprocessors. Also, the particular choice of component values shown in the drawings is intended to be only exemplary and not limiting. Alternate circuit arrangements can be devised for performing essentially the same steps described above. Some or all of the diagnostic tests and/or automatic calibration features can be omitted, if desired. These and other modifications should be deemed within the spirit and scope of the following claims.

What is claimed is:

1. In an apparatus for counting a plurality of parts, the apparatus including photoelectric means for sensing the presence of a part by observing the blockage of a beam of radiation caused by the presence of a part, and means for counting electrical pulses generated by the sensing means in response to the presence of a part, the improvement comprising a programmed computer for deactivating the counting means for an adjustable interval following the leading edge of one of said pulses, the computer being programmed to deactivate the counting means immediately upon detection of said leading edge, the interval being adjusted in accordance with the length of the parts being counted, wherein the apparatus counts a given part only one time.

2. Apparatus for counting a plurality of parts, comprising:

(a) means for directing said parts between a source of radiation and a detector of said radiation, so as to detect the presence of a part by sensing the amount of radiation received by the detector, and (b) programmable means for storing a value related to the level of current in the detector which must be observed in order to record a count, said level of current being called the programmed threshold current, (c) programmable means comprising means for comparing the stored value with the actual current flowing through the detector, and for recording a count when the actual current falls below the programmed threshold current for a predetermined period of time, the programmable means also comprising means for measuring the lengths of a plurality of parts passing the detector, and means for setting said period equal to or less than the shortest observed part.

3. A method of counting parts, comprising the steps of:

(a) determining whether a part is present by passing the part between a source of radiation and a detector, observing a change in current through the detector due to the blockage of radiation, and recording a count when the current in the detector falls below a programmed threshold, (b) setting a timer immediately upon determining that the current in the detector has fallen below the programmed threshold, the timer being programmed to wait for a predetermined time interval, the interval being based on the length of the parts being counted, and (c) resuming the counting only after the delay timer has reached the end of the predetermined interval.

4. A method of counting parts, comprising the step of determining whether a part is present by passing the part between a source of radiation and a detector, observing a change in current through the detector due to the blockage of radiation, and recording a count when the current level in the detector falls below a programmed threshold level, the method also comprising the step of performing at least one diagnostic test on the detector while the counting is being performed, the diagnostic test being performed substantially independently of the count-recording step, such that the result of the test is determined without regard to the number of counts being recorded.

5. The method of claim 4, wherein the diagnostic test includes testing for an open-circuited condition in the detector.

6. The method of claim 5, wherein the testing step comprises the step of determining whether the voltage at the detector has increased beyond a predetermined level.

7. The method of claim 6, wherein the detector is connected to an operational amplifier, and wherein the determining step includes the step of determining whether the output of the operational amplifier has fallen below a predetermined value.

8. The method of claim 4, wherein the diagnostic test includes testing for a short-circuited condition in the detector.

9. The method of claim 8, wherein the detector is connected to an operational amplifier, and wherein the testing step includes the step of determining whether the output of the operational amplifier has become too high.

10. The method of claim 4, wherein the diagnostic test includes determining whether the level of current in the detector is inconsistent with the type of part being counted.

11. The method of claim 10, wherein the determining step includes the steps of establishing a second threshold level, the second threshold level being different from the programmed threshold, and determining whether the current in the detector lies between the programmed threshold and the second threshold.

12. A method of calibrating a counting device, the counting device being of the type wherein a part to be counted is passed between a source of radiation and a detector, and wherein the device performs the counting by observing the blockage of radiation to the detector, the method comprising the steps of causing a plurality of parts to be counted to pass the detector, measuring the length of each such part by measuring the time during which radiation is blocked by the passage of each part, storing the length of the longest measured part, computing a value based on the stored maximum part length, using said value in subsequent runs of the device, such that the counting device is disabled, beginning with the detection of a part, for a time corresponding to said stored value.

13. The method of claim 12, wherein the counter does not record a count unless the radiation is blocked for a predetermined minimum amount of time, and wherein said minimum is determined by storing the minimum length of parts passing the detector, computing a value less than or equal to the stored minimum part length, and using the latter value in subsequent runs of the device, such that the counting device does not record a count unless the radiation is blocked for a time longer than the latter value.

14. A method of calibrating a counting device, the device including a source of radiation and a detector of said radiation, wherein parts to be counted are caused to pass between the source of radiation and the detector, so as to block radiation entering the detector, the method comprising the steps of measuring the current in the detector when there is no part blocking the radiation, storing the value of measured current, repeating the measuring and storing steps after a predetermined interval, comparing the measured amounts of current, and halting the system if the latter two values are not sufficiently close to each other.

15. A method of calibrating a counting device, the device including a source of radiation and a detector of said radiation, wherein parts to be counted are caused to pass between the source of radiation and the detector, so as to block radiation entering the detector, the counting device being capable of recording a count when the detector current falls below a programmed threshold, the counting device including an operational amplifier and a microprocessor, the microprocessor supplying a voltage to the amplifier, said voltage being related to a programmed threshold current, the method comprising the steps of determining a first value by measuring the signal needed from the microprocessor to record a count when there is no part blocking the detector, determining a second value by measuring the change in output of the amplifier due to the presence of the part and scaling said second value if necessary, and setting said voltage equal to the difference between the first and second values, said voltage being stored in the microprocessor and being used in subsequent operation of the counting device.

16. Apparatus for counting a plurality of parts, comprising:

(a) means for directing said parts between a source of radiation and a detector of said radiation, so as to detect the presence of a part by sensing the amount of radiation received by the detector, (b) programmable means for storing a value related to the level of current in the detector which must be observed in order to record a count, said level of current being called the programmed threshold current, and (c) means for comparing the stored value with the actual current flowing through the detector, and for recording a count when the actual current falls below the programmed threshold current, wherein the programmable means includes a microprocessor, the microprocessor being connected to a digital-to-analog converter, the converter being connected to the comparing means.

17. The apparatus of claim 16, wherein the apparatus includes first means for determining the amount of current flowing through the detector when there is no part present, second means for determining the amount of current flowing through the detector when a part blocks the radiation entering the detector, and means for storing the above-mentioned amounts.

18. The apparatus of claim 17, wherein the second means includes means for discharging a capacitor to a voltage which is related to the amount of current flowing through the detector when a part is present, means for comparing the voltage across the capacitor with a reference voltage, and means for varying the reference voltage until the reference voltage equals the voltage across the capacitor.

19. The apparatus of claim 18, further comprising means for recharging the capacitor to a voltage related to the maximum amount of current flowing through the detector when a part is not present.

20. Apparatus for counting a plurality of parts, comprising:

(a) means for directing said parts between a source of radiation and a detector of said radiation, so as to detect the presence of a part by sensing the amount of radiation received by the detector, (b) programmable means for storing a value related to the level of current in the detector which must be observed in order to record a count, said level of current being called the programmed threshold current, and (c) means for comparing the stored value with the actual current flowing through the detector, and for recording a count when the actual current falls below the programmed threshold current, the apparatus further comprising means for testing whether the detector has become open-circuited, the testing means being substantially simultaneously operable while the apparatus is counting parts, wherein the open-circuit testing means comprises means for determining whether the voltage at the detector has increased beyond a predetermined level.

21. The apparatus of claim 20, wherein the detector is connected to an operational amplifier, and wherein the open-circuit testing means also comprises means for determining whether the output of the operational amplifier has fallen below a predetermined value.

22. Apparatus for counting a plurality of parts, comprising:

(a) means for directing said parts between a source of radiation and a detector of said radiation, so as to detect the presence of a part by sensing the amount of radiation received by the detector, (b) programmable means for storing a value related to the level of current in the detector which must be observed in order to record a count, said level of current being called the programmed threshold current, and (c) means for comparing the stored value with the actual current flowing through the detector, and for recording a count when the actual current falls below the programmed threshold current, the apparatus further comprising means for testing whether the wrong kind of part has been detected, the testing means being substantially simultaneously operable while the apparatus is counting parts, the testing means including means for measuring the current in the detector when a part is present, and for comparing the current drop with a predetermined value, the latter value being called the "wrong part" threshold, and means for halting the counting if the current in the detector lies between the "wrong part" threshold and the programmed threshold.

23. Apparatus for counting a plurality of parts, comprising:

(a) means for directing said parts between a source of radiation and a detector of said radiation, so as to detect the presence of a part by sensing the amount of radiation received by the detector, (b) programmable means for storing a value related to the level of current in the detector which must be observed in order to record a count, said level of current being called the programmed threshold current, and (c) means for comparing the stored value with the actual current flowing through the detector, and for recording a count when the actual current falls below the programmed threshold current, the apparatus further comprising means for testing whether more than one part has blocked radiation entering the detector, the testing means including means for determining whether the current in the detector has fallen below the level that would be due to the presence of only one part, the testing means being substantially simultaneously operable while the apparatus is counting parts.

24. Apparatus for counting a plurality of parts, comprising:

(a) means for directing said parts between a source of radiation and a detector of said radiation, so as to detect the presence of a part by sensing the amount of radiation received by the detector, (b) programmable means for storing a value related to the level of current in the detector which must be observed in order to record a count, said level of current being called the programmed threshold current, and (c) means for comparing the stored value with the actual current flowing through the detector, and for recording a count when the actual current falls below the programmed threshold current, the apparatus further comprising means for determining whether the detector is open-circuited or short-circuited, and whether the wrong type of part is present, and whether a single count should be recorded as two counts due to the level to which the current in the detector falls, said determining means being substantially simultaneously operable while the apparatus is counting parts.

25. Apparatus for counting a plurality of parts, comprising:

(a) means for directing said parts between a source of radiation and a detector of said radiation, so as to detect the presence of a part by sensing the amount of radiation received by the detector, (b) programmable means for storing a value related to the level of current in the detector which must be observed in order to record a count, said level of current being called the programmed threshold current, and (c) means for comparing the stored value with the actual current flowing through the detector, and for recording a count when the actual current falls below the programmed threshold current, the apparatus further comprising means for deactivating the comparing and recording means for an adjustable time interval beginning with the moment that the detector current first falls below the programmed threshold, said interval being adjusted in accordance with the length of the parts being counted, wherein the apparatus counts a given part only one time.

26. The apparatus of claim 25, further comprising automatic means for determining and setting said time interval when a plurality of parts passes the detector.

27. Apparatus for counting a plurality of parts, comprising:

(a) means for directing said parts between a source of radiation and a detector of said radiation, so as to detect the presence of a part by sensing the amount of radiation received by the detector, (b) programmable means for storing a value related to the level of current in the detector which must be observed in order to record a count, said level of current being called the programmed threshold current, and (c) means for comparing the stored value with the actual current flowing through the detector, and for recording a count when the actual current falls below the programmed threshold current, the apparatus further comprising means for measuring the current in the detector when the apparatus is turned on, and for comparing the latter current with the corresponding value for a previous day.

28. A method of counting parts, comprising the steps of:

(a) determining whether a part is present by passing the part between a source of radiation and a detector, observing a change in current through the detector due to the blockage of radiation, and recording a count when the current in the detector falls below a programmed threshold, (b) setting a timer, the timer being programmed to wait for a predetermined time interval, the interval being based on the length of the parts being counted, and (c) resuming the counting only after the delay timer has reached the end of the predetermined interval, wherein the timer-setting step comprises the step of setting a value stored in a microprocessor, the microprocessor being programmed to ignore signals from the detector until the predetermined interval has elapsed.

29. A method of counting parts, comprising the step of determining whether a part is present by passing the part between a source of radiation and a detector, and observing a change in current through the detector due to the blockage of radiation, the observing step including the step of comparing the current flowing through the detector with a previously stored value of a programmed threshold current, and recording a count when the current level in the detector falls below the programmed threshold level, wherein the value of the threshold current is stored in a microprocessor, and wherein the comparing step includes comparing a signal, supplied by the microprocessor, to a signal generated by the detector.

30. A method of counting parts, comprising the step of determining whether a part is present by passing the part between a source of radiation and a detector, observing a change in current through the detector due to the blockage of radiation, and recording a count when the current level in the detector falls below a programmed threshold level, the method also comprising the step of performing at least one diagnostic test on the detector while the counting is being performed, wherein the diagnostic test includes testing for an open-circuited condition in the detector, and wherein the testing step comprises the step of determining whether the voltage at the detector has increased beyond a predetermined level.

31. The method of claim 50, wherein the detector is connected to an operational amplifier, and wherein the determining step includes the step of determining whether the output of the operational amplifier has fallen below a predetermined value.

32. A method of counting parts, comprising the step of determining whether a part is present by passing the part between a source of radiation and a detector, observing a change in current through the detector due to the blockage of radiation, and recording a count when the current level in the detector falls below a programmed threshold level, the method also comprising the step of performing at least one diagnostic test on the detector while the counting is being performed, wherein the diagnostic test includes testing for a short-circuited condition in the detector, wherein the detector is connected to an operational amplifier, and wherein the testing step includes the step of determining whether the output of the operational amplifier has become too high.

33. A method of counting parts, comprising the step of determining whether a part is present by passing the part between a source of radiation and a detector, observing a change in current through the detector due to the blockage of radiation, and recording a count when the current level in the detector falls below a programmed threshold level, the method also comprising the step of performing at least one diagnostic test on the detector while the counting is being performed, wherein the diagnostic test includes determining whether the level of current in the detector is inconsistent with the type of part being counted, and wherein the determining step includes the steps of establishing a second threshold level, the second threshold level being different from the programmed threshold, and determining whether the current in the detector lies between the programmed threshold and the second threshold.

34. Apparatus for counting a plurality of parts, comprising:

(a) means for directing said parts between a source of radiation and a detector of said radiation, so as to detect the presence of a part by sensing the amount of radiation received by the detector, (b) programmable means for storing a value related to the level of current in the detector which must be observed in order to record a count, said level of current being called the programmed threshold current, and (c) means for comparing the stored value with the actual current flowing through the detector, and for recording a count when the actual current falls below the programmed threshold current, the apparatus further comprising means for testing whether the detector has become open-circuited, the testing means being substantially simultaneously operable while the apparatus is counting parts, the testing means also being substantially independent of the count-recording means.

35. Apparatus for counting a plurality of parts, comprising:

(c) means for directing said parts between a source of radiation and a detector of said radiation, so as to detect the presence of a part by sensing the amount of radiation received by the detector, (b) programmable means for storing a value related to the level of current in the detector which must be observed in order to record a count, said level of current being called the programmed threshold current, and (c) means for comparing the stored value with the actual current flowing through the detector, and for recording a count when the actual current falls below the programmed threshold current, the apparatus further comprising means for testing whether the detector has become short-circuited, the testing means being substantially simultaneously operable while the apparatus is counting parts, the testing means also being substantially independent of the count-recording means.

* * * * *